(12) United States Patent
Wang et al.

(10) Patent No.: US 7,949,708 B2
(45) Date of Patent: May 24, 2011

(54) USING A REMOTE HANDHELD DEVICE AS A LOCAL DEVICE

(75) Inventors: Jian Wang, Beijing (CN); Yang Li, Beijing (CN); Lifeng Wang, Beijing (CN); Chao Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 251 days.

(21) Appl. No.: 11/811,057

(22) Filed: Jun. 8, 2007

(65) Prior Publication Data

US 2008/0307096 A1 Dec. 11, 2008

(51) Int. Cl.
*G06F 15/16* (2006.01)
(52) U.S. Cl. .......................... 709/203; 709/220; 713/324
(58) Field of Classification Search .................. 709/227, 709/203, 208
See application file for complete search history.

(56) References Cited

U.S. PATENT DOCUMENTS

| | | | |
|---|---|---|---|
| 5,895,452 A * | 4/1999 | Lum ................................ | 705/16 |
| 6,049,885 A * | 4/2000 | Gibson et al. .................. | 713/324 |
| 6,448,958 B1 | 9/2002 | Muta | |
| 6,480,586 B1 * | 11/2002 | Hayes et al. ............. | 379/102.02 |
| 6,590,596 B1 | 7/2003 | Rector | |
| 6,907,301 B2 * | 6/2005 | Kou et al. ....................... | 700/19 |
| 7,072,945 B1 | 7/2006 | Nieminen et al. | |
| 7,085,623 B2 | 8/2006 | Siegers | |
| 2002/0049610 A1 * | 4/2002 | Gropper ............................ | 705/1 |
| 2002/0078293 A1 * | 6/2002 | Kou et al. ...................... | 710/305 |
| 2003/0110503 A1 | 6/2003 | Perkes | |
| 2005/0021870 A1 | 1/2005 | Carnahan et al. | |
| 2005/0055472 A1 | 3/2005 | Krzyzanowski et al. | |
| 2005/0179674 A1 | 8/2005 | Mehrotra et al. | |
| 2005/0203647 A1 * | 9/2005 | Landry et al. ................... | 700/83 |
| 2006/0007151 A1 | 1/2006 | Ram | |
| 2006/0084442 A1 * | 4/2006 | Kotzin et al. .................. | 455/445 |
| 2006/0235944 A1 | 10/2006 | Haslam | |
| 2007/0002011 A1 | 1/2007 | Kurlander et al. | |
| 2007/0042806 A1 | 2/2007 | Stepanian | |
| 2007/0043550 A1 | 2/2007 | Tzruya | |
| 2007/0262952 A1 | 11/2007 | Nadalin | |
| 2008/0010482 A1 | 1/2008 | Tsang | |
| 2008/0125101 A1 * | 5/2008 | Bakos et al. ................... | 455/418 |
| 2008/0139195 A1 * | 6/2008 | Marsyla et al. ................ | 455/423 |
| 2008/0168807 A1 * | 7/2008 | Dion et al. ......................... | 70/94 |
| 2008/0280591 A1 * | 11/2008 | Opaluch ........................ | 455/410 |

OTHER PUBLICATIONS

"Salling Clicker for Windows", http://www.salling.com/Clicker/windows/.
Ballagas, et al., "The Smart Phone: A Ubiquitous Input Device", pp. 1-9, http://eis.comp.lancs.ac.uk/fileadmin/eis/publication/2005-SmartPhone.pdf.
Myers Brad A., et al., "Using Handhelds for Wireless Remote Control of PCs and Appliances", Interacting with Computers 17, Date: 2005, pp. 251-264.
Myers, et al., "Taking Handheld Devices to the Next Level", Date: Dec. 2004, http://china.computer.org/portal/site/computer/menuitem.5d61c1d591162e4b0ef1bd108bcd45f3/index.jsp?&pName=computer_level1_article&TheCat=1005&path=computer/homepage/1204/myers&file=myersIndex.xml&xsl=article.xsl&.
Freshmeat, "http://freshmeat.net/projects/xbindkeys," Mar. 2003.
Cinema Premiere, "DVD to DivX," 2005, www.cinemapremiere.com/guides/dvdtodivx/BSPlayer.htm.

* cited by examiner

*Primary Examiner* — Wing F Chan
*Assistant Examiner* — Tesfay Yohannes

(57) ABSTRACT

A data connection can be established between a handheld device (e.g., a mobile phone or smartphone) and a computerized second device. For example, an action associated with a keyboard scancode can be mapped to a key on the keypad of the handheld device. A key press on a keypad of the handheld device can be translated into key press data. The key press data can be sent to the second device over the data connection, causing the action to be executed on the second device.

20 Claims, 3 Drawing Sheets

USING A REMOTE HANDHELD DEVICE AS A LOCAL DEVICE

BACKGROUND

Conventional computing devices enable users to enter inputs and interact with the computer in different ways. For example, an alphanumeric keyboard or a cursor control device (e.g., a mouse) can be used to indicate a choice or to input data. These types of input devices are both convenient and familiar to most users. Wireless versions of these input devices can be even more convenient, by eliminating the need for cables that connect one device to another.

Still, wireless keyboards remain relatively bulky. Also, many of today's households have more than one computer, each with its own keyboard and mouse. There are advantages to using one keyboard and one mouse to control all of the household's computers, but this can be problematic when situations arise in which different users want to use the computers at the same time.

SUMMARY

A data connection can be established between a handheld device (e.g., a mobile phone or smartphone) and a computerized second device. An action associated with a keyboard scancode can be mapped to a key on the keypad of the handheld device. A key press on a keypad of the handheld device can be translated into key press data. The key press data can be sent to the second device over the data connection, causing the action to be executed on the second device. In this manner, the handheld device can be used to simulate the local keyboard of, for example, a personal computer. In an analogous manner, other features of the handheld device can be used to simulate a mouse or a local camera.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The accompanying drawings, which are incorporated in and form a part of this specification, illustrate embodiments and, together with the description, serve to explain the principles of the embodiments.

DETAILED DESCRIPTION

Figure 1:
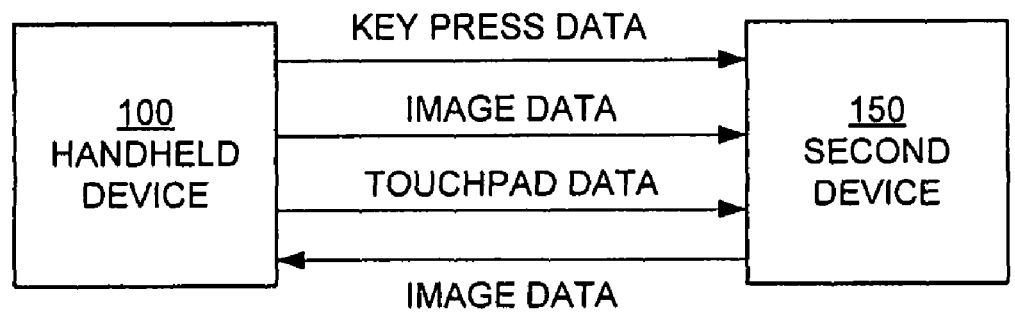
FIG. 1 is a block diagram showing a handheld device and another device in one embodiment.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "establishing," "selecting," "translating," "mapping," "sending," "executing," "receiving," "rendering," "detecting," "associating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information.

Communication media can embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer readable media.

FIG. 1 is a block diagram showing a computerized handheld device 100 and a computerized second device 150 in communication with each other. Handheld device 100 may be, for example, a smartphone, a personal digital assistant, a cell phone or mobile phone, or the like. Handheld device 100 incorporates some form of alphanumeric keypad. Handheld device 100 may also incorporate some form of a display device (e.g., a display screen). In some types of handheld devices, the display screen can function as a touchpad or touch screen—that is, for example, an object such as a stylus, a pen, a probe or a user's fingertip can be pressed (touched) against the display screen, or brought within sensing range of the touchpad, causing an action that is associated with the position of the object (relative to the touchpad) to be performed. Handheld device 100 may also incorporate a digital camera.

Second device 150 is some type of personal computer (PC) system, such as a desktop, laptop or notebook PC. Generally speaking, handheld device 100 and second device 150 each incorporate at least one processing unit and a memory. Depending on the exact configuration and type of computing device, the memory may be volatile (such as RAM), non-volatile (such as ROM, flash memory, etc.) or some combination of the two. The devices 100 and 150 may each also include additional storage (removable and/or non-removable) including, but not limited to, magnetic or optical disks or tape. The devices 100 and 150 each also include some form of communications connection(s) that allow the device to communicate wirelessly with other devices and with each other using, for example, an Infrared Data Association (IrDA), Bluetooth® or WiFi® connection interface. Alternatively, devices 100 and 150 can communicate with each other using a wired connection interface such as a universal serial bus (USB) or Ethernet connection interface.

In the example of FIG. 1, a key press on the keypad of the handheld device 100 is translated into key press data. More specifically, when a key on the handheld device 100 is pressed, the code associated with that key is translated into a keyboard scancode. Because a keypad on a handheld device generally has fewer keys than a standard PC keyboard, the keys on the handheld device 100 are mapped to a subset of the set of scancodes that are typically associated with a standard keyboard. In this manner, certain actions, each of which is associated with a particular keyboard scancode, can be mapped to respective keys on the keypad of the handheld device 100, and vice versa.

A key on the handheld device 100 may be mapped to a single key (or scancode) on a standard keyboard, or a key on the handheld device 100 may be mapped to multiple keys (scancodes) on a standard keyboard. In the latter instance, a single key press on the handheld device 100 can simulate the pressing of a combination of multiple keys on a standard keyboard, such as "Alt+Tab" or "Ctrl+Alt+Del."

A default mapping of the handheld device's keypad to a standard keyboard may be used. Alternatively, a user may define a customized mapping. Furthermore, a user can define multiple customized mappings, such that one mapping is used with one application and another mapping with another application.

Key press data can be sent, via the data connection, from the handheld device 100 to the second device 150. The second device 150 can then execute the action dictated by the key press data. In one embodiment, the second device 150 sends image data (e.g., for a thumbnail image) to handheld device 100, allowing the user to view, on the handheld device's display, the result of the action that was executed.

Continuing with reference to FIG. 1, image data (e.g., for still pictures or videos) can also be sent from the handheld device 100 to the second device 150. More specifically, image data can be captured by a camera on handheld device 100 and sent to second device 150. In this manner, the camera on handheld device 100 can be used as a local camera for second device 150.

Also, touchpad data can be sent from the handheld device 100 to the second device 150. More specifically, as mentioned above, handheld device 100 can include a touchpad (e.g., a capacitance sensor) that is able to detect an object (e.g., a user's finger, a stylus, a pen, a probe or the like) that is within sensing range of or in contact with the touchpad. The sensed position of the object relative to the touchpad can be conventionally translated into an action that is executed by the handheld device 100. According to one embodiment, the sensed position of the object can also be translated into a code that can be mapped to an action executable by the second device 150. The code can be transmitted from the handheld device 100 to the second device 150, which can then execute the action dictated by the code. In a manner similar to that described above, the second device 150 can send image data (e.g., a thumbnail) to the handheld device 100, allowing the user to view, on the handheld's display, the result of the executed action.

Thus, moving a stylus or a finger across or over the surface of a touchpad (which may be incorporated within the display screen) on the handheld device 100 can result in a scrolling type of action on the second device 150. Also, touching a computer graphic (e.g., a simulated button) on the touchpad or display screen of the handheld device 100 can result in an action being executed on the second device 150. In addition, a touch to the touchpad on handheld device 100 can be translated into a mouse click on second device 150. Accordingly, handheld device 100 can be used as a local cursor control device (e.g., mouse) for the second device 150.

In one embodiment, communication between the handheld device 100 and the second device 150 is subject to security constraints. For example, a user can define a group of devices, and only devices that are members of that group can discover and connect with the second device 150. A password may also be used.

Figure 2:
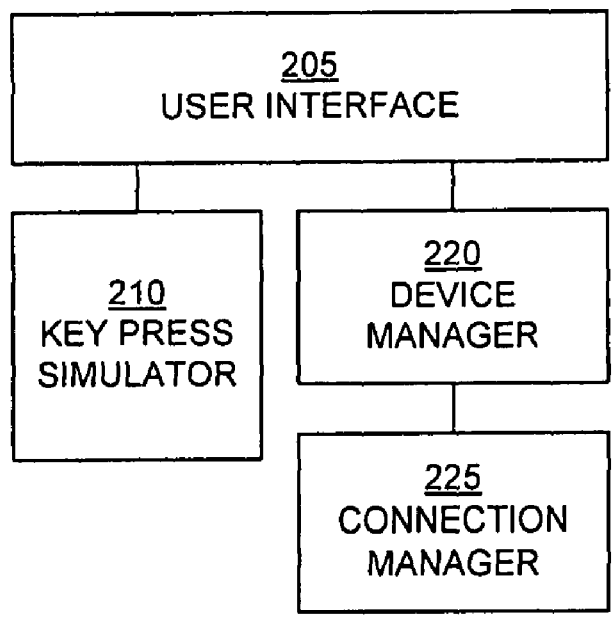
FIG. 2 is a block diagram showing computer-executable components implemented on a handheld device in one embodiment.

FIG. 2 is a block diagram showing computer-executable components implemented on a handheld device 100 in one embodiment. In the example of FIG. 2, these components include user interface 205, key press simulator 210, device manager 220, and connection manager 225. Although these components are illustrated as separate entities for purposes of discussion, in practice they may or may not be implemented as such. In other words, the functions performed by these components can be performed (perhaps with other functions) using software configured differently than that illustrated in FIG. 2.

In one embodiment, with reference also to FIG. 1, user interface 205 receives the code generated when a key on the handheld device's keypad is pressed, and passes that code to the key press simulator 210. In another embodiment, via connection manager 225, user interface 205 also receives and renders image data sent from the second device 150, so that actions that are executed on the second device can be viewed on a display screen of the handheld device 100.

In one embodiment, the key press simulator 210 (in conjunction with user interface 205) allows a user to customize the mapping of the keypad on the handheld device 100 to the scancodes of a standard PC keyboard. Utilizing either a customized mapping or a default mapping, the key press simulator 210 also translates the code generated when a key is pressed on the handheld device's keypad into a keyboard scancode. As noted above, a single code (associated with a single key press on the handheld device's keypad) can be translated into a combination consisting of multiple scancodes.

In one embodiment, device manager 220 receives and manages a request from the second device 150 to make the handheld device's keypad the local keyboard of the second device. In one embodiment, after device manager 220 accepts such a request, any request to make the handheld device's keypad the local keyboard of another device is refused. Once the remote keypad of the handheld device 100 is no longer to be used as a local keyboard for the second device 150, the data connection between the handheld device and the second device is closed, and the handheld device is then open to requests from other devices.

In a similar manner, device manager 220 can also receive and manage a request from the second device 150 to make the handheld device act as the local mouse of the second device, and can also receive and manage a request from the second device to make the handheld device's camera the local camera of the second device. In general, the same software architecture can be used to share the features (e.g., keypad, camera, etc.) of the handheld device 100 with the second device 150.

In one embodiment, connection manager 225 provides an inter-process communication (IPC) mechanism between networked processes on handheld device 100 and second device 150. Connection manager 225 also can provide connection application program interfaces (APIs) that allow the handheld device 100 and the second device 150 to establish a data connection and communicate with each other (that is, the data connection is bi-directional). Knowledge of the type of connection interface (e.g., Ethernet, WiFi®, Bluetooth®, USB, IrDA) being used is not required.

In the present embodiment, a connection manager is used on both the handheld device 100 and the second device 150. The connection managers on the handheld device 100 and the second device 150 provide similar functionality, including functionality that allows these devices to automatically discover (detect) each other, communicate with each other, and monitor the state of the data connection. The connection managers are described in more detail in conjunction with FIG. 4, below.

Figure 3:
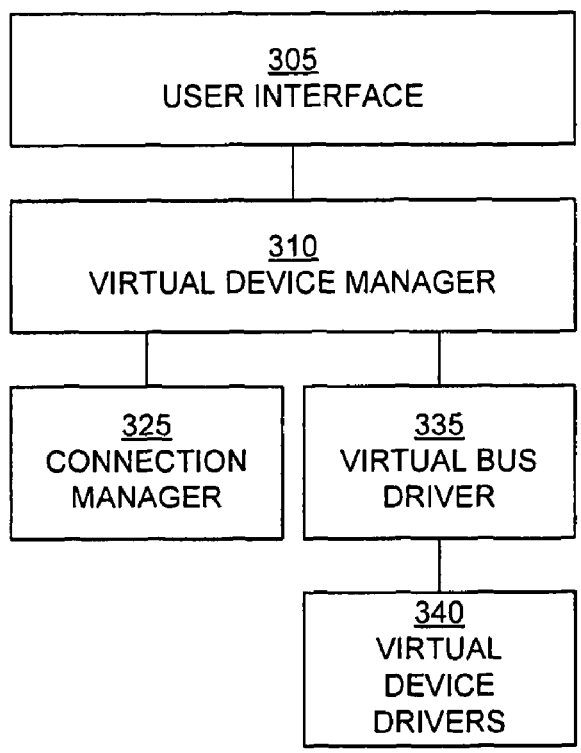
FIG. 3 is a block diagram showing computer-executable components implemented on a computer in one embodiment.

FIG. 3 is a block diagram showing computer-executable components implemented on a computer (e.g., second device 150 of FIG. 1) in one embodiment. In the example of FIG. 3, these components include user interface 305, virtual device manager 310, connection manager 325, virtual bus driver 335 and virtual device drivers 340. Although these components are illustrated as separate entities for purposes of discussion, in practice they may or may not be implemented as such. In other words, the functions performed by these components can be performed (perhaps with other functions) using software configured differently than that illustrated in FIG. 3.

In one embodiment, with reference also to FIG. 1, user interface 305 can be used to display a list of handheld devices within communication range of the second device 150. User interface 305 also provides a mechanism that allows a user to select one of the handheld devices to be used as, for example, the local keyboard, mouse or camera for second device 150.

In general, connection manager 325 performs functions similar to those performed by connection manager 225 of FIG. 2, except on behalf of second device 150. Connection manager 325 is described in more detail in conjunction with FIG. 4.

In one embodiment, and continuing with reference to FIGS. 1 and 3, virtual device manager 310 sends a request to the handheld device 100 to make the handheld device's keypad the local keyboard of the second device 150. If the request is accepted, then virtual device manager 310 requests the virtual bus driver 335 to "plug in" a virtual device driver 340 that represents the handheld device's keypad as the local keyboard.

Virtual bus driver 335 has the capability to manage multiple virtual devices. Thus, virtual device manager 310 can also send requests to the handheld device 100 to make the handheld device act as the local mouse of the second device 150 and to make the handheld device's camera the local camera of the second device. In general, the same software architecture can be used to allow the features (e.g., keypad, camera, etc.) of the handheld device 100 to be shared with the second device 150. If any of the requests are accepted, then virtual device manager 310 requests the virtual bus driver 335 to plug in the appropriate virtual device driver 340.

The virtual device drivers 340 for the keyboard and mouse functions forward data to the operating system as the data is received. In contrast, image data received from the handheld device 100 may be buffered by virtual device manager 310 or by the appropriate virtual device driver 340, in order to accumulate a frame of data before the data is sent to the appropriate application. Support is provided for WIN32 APIs including video capture devices such as DirectShow®.

In general, virtual device drivers 340 each represent a virtual device (that is, a device that does not have local hardware on second device 150, such as the handheld device's keypad) as a real (physical) device to the operating system of second device 150. When, for example, key press data is received from handheld device 100, the virtual device manager 310 sends that data to the virtual bus driver 335, which in turn sends the data to the appropriate virtual device driver 340. Once the keypad of the handheld device 100 is no longer to be used as the local keyboard, the virtual device manager 310 requests the virtual bus driver 335 to "unplug" the virtual device driver 340 that represents the handheld device's keypad and also sends a request to the handheld device 100 to close the data connection with the second device 150. In a similar manner, other features of the handheld device 100 (e.g., the camera, or the cursor control function) can be unplugged from the appropriate virtual device driver 340.

In a conventional sense, a bus has hardware support, and devices connected to the bus are designed according to the bus requirements and have local hardware. However, a virtual device such as the keypad of handheld device 100 does not have local hardware (relative to second device 150). Virtual bus driver 335 controls a virtual bus that is represented to an operating system and to other applications as a conventional hardware bus (e.g., a PCI bus, AGP bus or USB). The virtual bus connects and manages virtual devices, permitting virtual devices that do not have local hardware to connect with the second device 150 in a Plug and Play (PnP) manner.

To plug a virtual device into a virtual bus using PnP, virtual bus driver 335 first receives a request to plug in the device. The virtual bus driver 335 creates a child physical device object (PDO) for the virtual device and adds the virtual device to a local device list. A PnP manager sends a PnP input/output request packet (IRP) to the virtual bus to query the updated device list, and the virtual bus driver 335 responds with a list of attached devices. By comparing the updated list with the previous list, the operating system is made aware of the presence of a new, connected device. The PnP manager sends a series of PnP events to the virtual bus in order to obtain information about the new device, and the virtual bus driver 335 responds with the device information. The operating system then loads the appropriate virtual device driver 340 based on the device information. The virtual device is now ready for use and can send and receive information similar to other local devices. When a virtual device is removed, the PnP manager sends a series of PnP events to the virtual bus driver 335 and the appropriate virtual device driver 340. The virtual bus driver 335 responds by removing the device's PDO from the device list.

In one embodiment, the virtual device drivers 340, the virtual bus driver 335, and the connection manager 325 are part of a service that may be started automatically before the operating system is logged on. Thus, second device 150 can be controlled from handheld device 100 before the operating system on the second device is logged on. These elements are also receptive to information received from the handheld device 100 when the second device 150 is in a sleep state (e.g., a low power mode), such that a signal from the handheld device sent over the data connection will awaken the second device.

Figure 4:
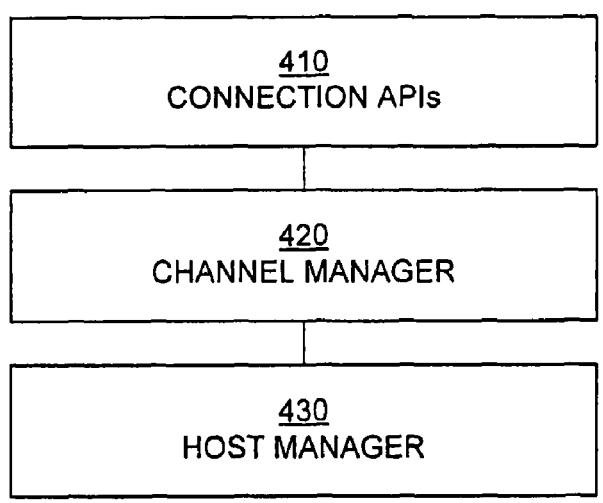
FIG. 4 is a block diagram showing computer-executable components that can be implemented on either or both an aggregated handheld device and a computer in one embodiment.

FIG. 4 is a block diagram showing computer-executable components of a connection manager 425 that is analogous to the connection managers 225 and 325 of FIGS. 2 and 3, respectively. In the example of FIG. 4, the connection manager 425 includes connection APIs 410, channel manager 420, and host manager 430. Although these components are illustrated as separate entities for purposes of discussion, in practice they may or may not be implemented as such. In other words, the functions performed by these components can be performed (perhaps with other functions) using software configured differently than that illustrated in FIG. 4.

In the present embodiment, connection manager 425 hides the details of the underlying physical mediums and topologies, and provides unified APIs that allow devices to communicate with each other seamlessly and transparently. In one embodiment, the connection APIs 410 include a set of functions that can be called by applications. These functions include, but are not limited to, functions that: initialize the connection manager; release resources associated with the connection manager; create a virtual named channel; destroy a virtual named channel; wait for an incoming connection to a virtual named channel and open a channel instance on the virtual named channel; close a channel instance and the connection; connect to a virtual named channel; disconnect from a virtual named channel; read data from a virtual named channel instance; write data to a virtual named channel instance; enumerate available virtual named channels by name; and retrieve information (e.g., channel name, properties, and endpoint address) about a virtual named channel.

A virtual named channel is a named, duplex communication channel. All instances of a virtual named channel share the same pipe name, but each instance has its own buffer and handle and provides a separate conduit for communication between devices. A virtual named channel can be viewed as a server that can be connected to one or more clients. In the present embodiment, the virtual named channels are managed by channel manager 420, which also manages the mapping between virtual named channel instances and underlying sockets, controls how data is received or sent over a virtual named channel, and handles exceptions and errors on virtual named channels.

In the present embodiment, host manager 430 handles the details of discovering available devices and resolves network addresses of such devices. In one embodiment, channel manager 420 chooses a connection interface, from among a number of available connection interfaces, based on a measurable attribute of the connection interfaces. In general, the "best" connection interface among those available is chosen. For example, the connection interface having the greatest bandwidth may be chosen.

Figure 5:
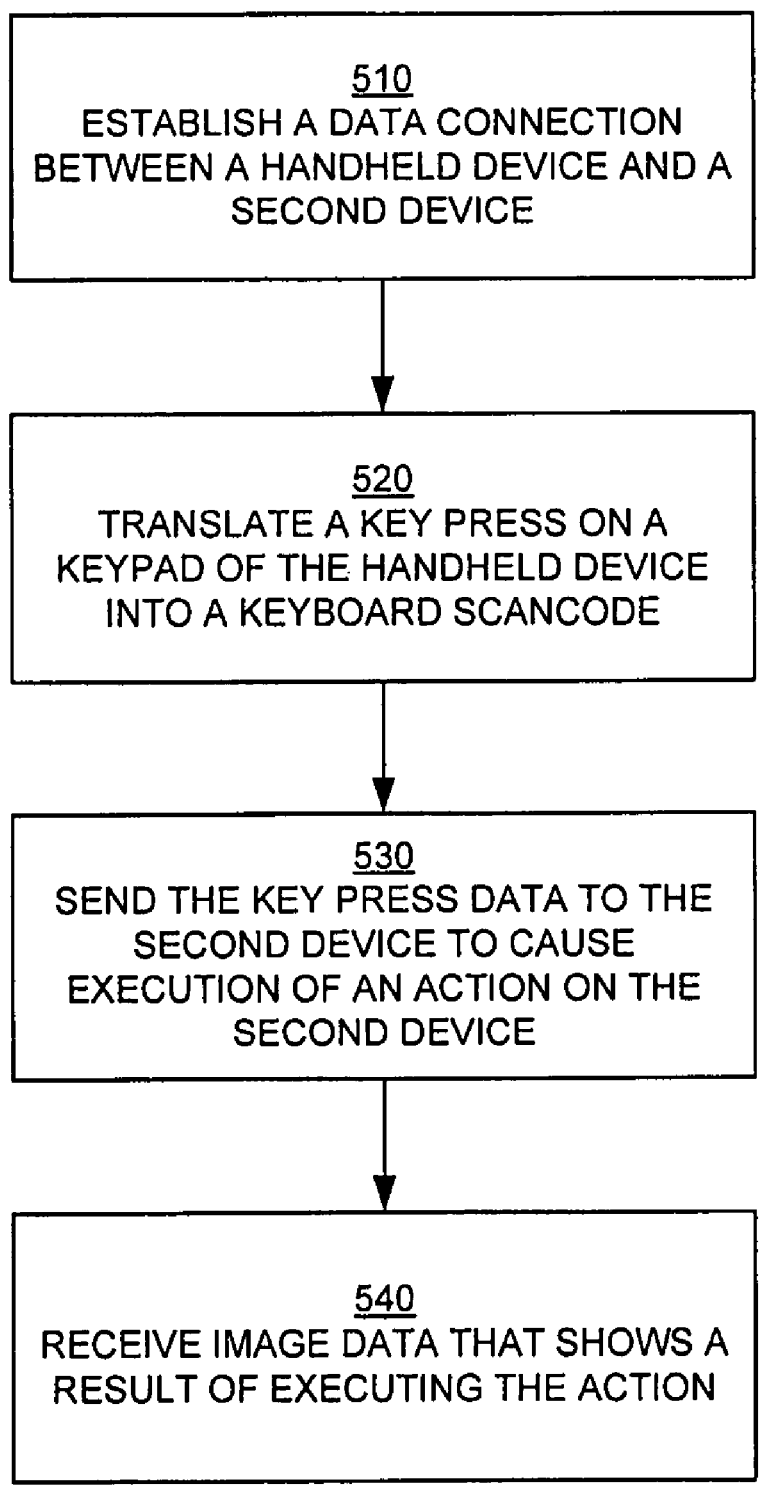
FIG. 5 is a flowchart of one embodiment of a method for aggregating a handheld device and another device.

FIG. 5 is a flowchart 500 of one embodiment of a method for aggregating a handheld device and another device. Although specific steps are disclosed in flowchart 500, such steps are exemplary. That is, various other steps or variations of the steps recited in flowchart 500 can be performed. The steps in flowchart 500 may be performed in an order different than presented. Furthermore, the features of the various embodiments described by flowchart 500 can be used alone or in combination with each other. In one embodiment, flowchart 500 can be implemented by handheld device 100 (FIG. 1) as computer-readable program instructions stored in a memory unit and executed by a processor.

In block 510 of FIG. 5, a data connection between a computerized handheld device (e.g., a smartphone, PDA or mobile phone) and a computerized second device (e.g., a PC) is established. In one embodiment, a connection interface (e.g., Ethernet, WiFi®, Bluetooth®, USB, IrDA) is automatically selected from a number of connection interfaces.

In block 520, in one embodiment, a key press on a keypad of the handheld device is translated into key press data that maps an action associated with a keyboard scancode to a key on the keypad of the handheld device.

In block 530, in one embodiment, the key press data is sent to the second device over the data connection, and the second device then executes the action after disposition of the key press data.

In block 540, in one embodiment, image data is sent over the data connection from the second device to the first device. The image data may or may not be compressed. The image data, when displayed, shows on the handheld device a result associated with the action being executed on the second device.

In another embodiment, image data captured by a camera on the handheld device can be sent to the second device. In yet another embodiment, the handheld device can be used as, for example, a mouse for the second device.

In summary, according to embodiments described herein, a feature (e.g., a keypad or camera) of a remote handheld device (e.g., a smartphone) can be used as a local device (e.g., a keyboard, mouse or Webcam) on a second device (e.g., a PC). Thus, for example, in households in which there are multiple PCs, a single keyboard and mouse can be used to control all of the PCs—because more and more people regularly carry or have access to mobile phones and the like, if a situation arises in which different users want to use the PCs at the same time, one user can use the conventional keyboard and mouse, while other users can use their handheld devices as keyboards and mice. Because thumbnail images of what transpires on the PC can be sent to the handheld devices, users can be some distance away from the PC they are controlling (the distance would depend on the type of connection interface in use).

In addition to other advantages mentioned herein, embodiments described herein are extensible to new types of connection interfaces and new features of handheld devices (in other words, new types of virtual devices).

In the foregoing specification, embodiments have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method comprising:
   establishing a device-to-device data connection between a computerized handheld device and a computerized second device, said computerized handheld device having a keypad and mobile phone capability, said computerized second device having a local keyboard, wherein said establishing comprises automatically selecting a connection interface from a plurality of connection interfaces when said computerized handheld device and said computerized second device discover each other;
   receiving, at said computerized handheld device, a request to make said keypad of said computerized handheld device act as a local input device of said computerized second device, said request sent from said computerized second device over said data connection;
   translating, at said computerized handheld device, a key press on said keypad of said computerized handheld device into key press data, said translating comprising mapping an action that is executable by said computerized second device and associated with a particular keyboard scancode of said keyboard of said computerized second device to a key on said keypad of said computerized handheld device by mapping a code associated with said key press on said keypad of said computerized handheld device to said particular keyboard scancode of said keyboard of said computerized second device that executes said action on said computerized second device; and
   sending said key press data to said computerized second device over said data connection to cause execution of said action on said computerized second device.

2. The method of claim 1 wherein said computerized handheld device is one of a personal digital assistant having mobile phone capability, a smartphone, and a cell phone.

3. The method of claim 1 further comprising selecting a mapping to be used for an application resident on said computerized second device from a plurality of user-defined mappings resident on said computerized handheld device, each of said plurality of user-defined mappings being associated with a different application.

4. The method of claim 1 wherein selecting said connection interface from said plurality of connection interfaces comprises selecting one of an infrared connection interface and a Bluetooth® connection interface.

5. The method of claim 1 further comprising:
   receiving image data from said computerized second device via said data connection; and
   rendering said image data on a display of said computerized handheld device, wherein said rendering shows a result of executing said action on said computerized second device.

6. The method of claim 1 further comprising sending image data captured by a camera of said computerized handheld device to said computerized second device via said data connection.

7. The method of claim 1 further comprising mapping a sensed position of an object relative to a touchpad of said computerized handheld device to keyboard scancode of said keyboard of said computerized second device that executes an action on said computerized second device.

8. The method of claim 1 wherein said computerized handheld device and said computerized second device automatically discover each other when said computerized handled device is within communication range of said computerized second device.

9. The method of claim 1 wherein said computerized handheld device is associated with a user-defined group and a password that allow said computerized handheld device to connect with said computerized second device.

10. A computer-readable storage medium that does not consist of a signal, said computer-readable storage medium storing computer-executable components that, when executed by a computerized handheld device, perform a method for aggregating said computerized handheld device and a computerized second device, said computer-executable components comprising:
   a connection manager that establishes a device-to-device data connection between said computerized handheld device and said computerized second device, said computerized handheld device having a keypad and mobile phone capability, said computerized second device having a local keyboard, wherein said connection manager automatically selects a connection interface from a plurality of connection interfaces when said computerized handheld device and said computerized second device discover each other;
   a device manager coupled to said connection manager that receives a request to make said keypad of said computerized handheld device act as a local input device of said computerized second device, said request sent from said computerized second device over said data connection;
   a user interface that associates a key press on said keypad of said computerized handheld device with a first code;
   a key press simulator coupled to said user interface that translates key presses of said computerized handheld device into key press data by mapping actions executable by said computerized second device and associated with particular keyboard scancodes of said keyboard of said computerized second device to keys on said keypad of said computerized handheld device, wherein said key press simulator maps said first code to a particular keyboard scancode of said keyboard of said computerized second device that executes a corresponding action on said computerized second device, and wherein said key press data is sent to said computerized second device over said data connection to cause execution of said corresponding action on said computerized second device.

11. The computer-readable storage medium of claim 10 wherein said key press simulator selects a mapping to be used for an application resident on said computerized second device from a plurality of user-defined mappings, each of said plurality of user-defined mappings being associated with a different application.

12. The computer-readable storage medium of claim 10 wherein said device manager:
   accepts said request sent from said computerized second device over said data connection to make said keypad of said computerized handheld device act as a local input device of said computerized second device, and
   refuses other requests from other computerized devices to make said keypad of said computerized handheld device act as a local input device of said other computerized devices until said data connection is closed.

13. The computer-readable storage medium of claim 10 wherein:
   said device manager acquires image data captured by a camera of said computerized handheld device and forwards said image data to said connection manager, and
   said connection manager forwards said image data to said computerized second device over said data connection.

14. The computer-readable storage medium of claim 10 wherein said key press simulator maps proximity of an object to a touchpad of said computerized handheld device to keyboard scancode of said keyboard of said computerized second device that executes an action on said computerized second device.

15. A computer-readable storage medium that does not consist of a signal, said computer-readable storage medium storing computer-executable components that, when executed by a computerized device, perform a method for aggregating a smartphone and said computerized device, said computer-executable components comprising:

a first virtual device driver;

a virtual bus driver coupled to said first virtual device driver;

a connection manager that automatically detects said smartphone when in communication range of said computerized device and automatically selects a connection interface from a plurality of connection interfaces to establish a device-to-device data connection between said computerized device and said smartphone; and a virtual device manager coupled to said connection manager that sends a request to make a keypad of said smartphone act as a local input device of said computerized device over said data connection to said smartphone, wherein:

when said request is accepted by said smartphone, said virtual device manager requests said virtual bus driver to plug in said first virtual device driver to represent said keypad of said smartphone to an operating system of said computerized device, said virtual bus driver transfers first data received over said data connection from said smartphone to said first virtual device driver, said first data comprises a particular keyboard scancode of a keyboard of said computerized device that is associated with an action executable by said computerized device, and said first data is generated by said smartphone in response to mapping a code associated with a key press on said keypad of said smartphone to said particular keyboard scancode of said keyboard of said computerized device that executes said action on said computerized device.

16. The computer-readable storage medium of claim 15 further comprising a second virtual device driver coupled to said virtual bus driver, wherein:

said virtual bus driver transfers second data received over said data connection from said smartphone to said second virtual device driver, and said second data comprises image data captured by a camera of said smartphone.

17. The computer-readable storage medium of claim 15 further comprising a third virtual device driver coupled to said virtual bus driver, wherein:

said virtual bus driver transfers third data received over said data connection from said smart phone to said third virtual device driver, and said third data comprises a keyboard scancode of said keyboard of said computerized device generated by said smartphone in response to mapping proximity of an object to a touchpad of said smartphone to keyboard scancode of said keyboard of said computerized device.

18. The computer-readable storage medium of claim 15 further comprising a user interface coupled to said connection manager, wherein said user interface displays information indicating said smartphone has been detected.

19. The computer-readable storage medium of claim 15 wherein:

said particular keyboard scancode causes said action to be executed on said computerized device, said computerized device sends image data to said smartphone via said data connection, and said image data when rendered on a display device of said smartphone shows a result of executing said action on said second device.

20. The computer-readable storage medium of claim 15 wherein said first virtual device driver, said virtual bus driver, and said connection manager are receptive to information received from said smartphone over said data connection when said computerized device is in a sleep state such that a signal sent from said smartphone over said data connection awakens said second device.

* * * * *